F. L. SESSIONS.
VEHICLE WHEEL RIM.
APPLICATION FILED MAY 5, 1913.
1,112,568. Patented Oct. 6, 1914.
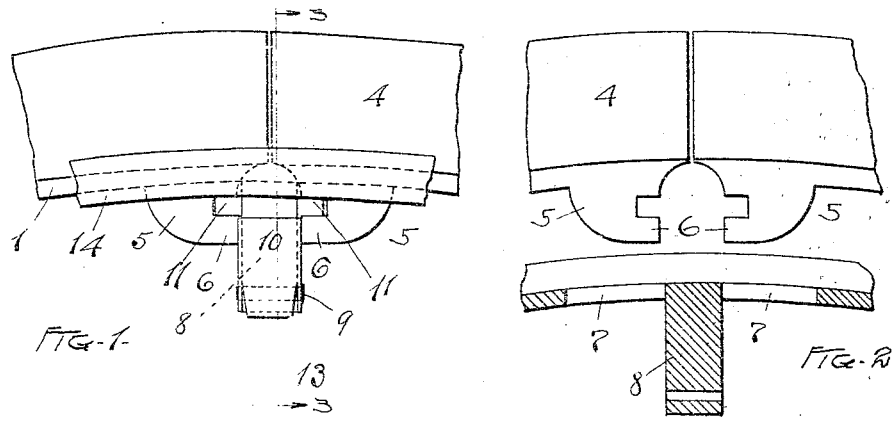
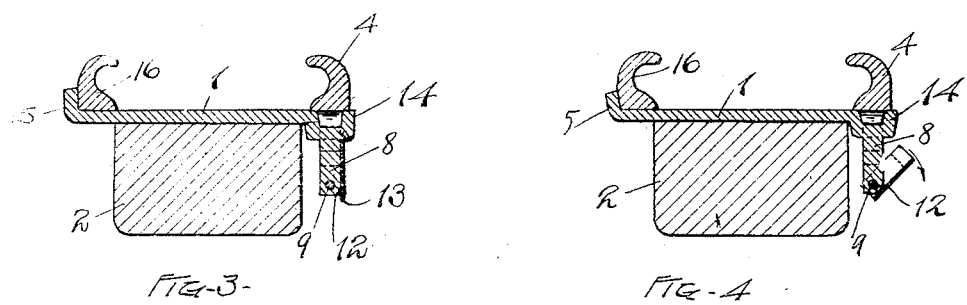
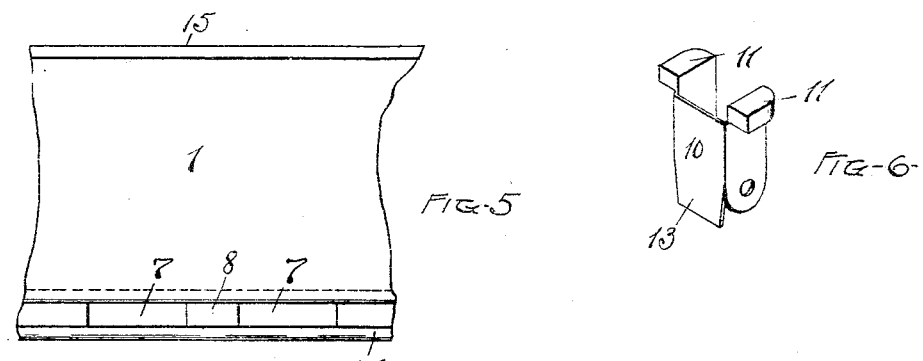
WITNESSES—
Oliver M. Kappler
Horace D. Fay
INVENTOR
Frank L. Sessions
BY Fay and Oberlin
ATTORNEYS—

UNITED STATES PATENT OFFICE.

FRANK L. SESSIONS, OF LAKEWOOD, OHIO, ASSIGNOR TO THE STANDARD WELDING COMPANY, OF CLEVELAND, OHIO, A CORPORATION OF OHIO.

VEHICLE WHEEL-RIM.

1,112,568.

Specification of Letters Patent.

Patented Oct. 6, 1914.

Application filed May 5, 1913. Serial No. 765,639.

*To all whom it may concern:*

Be it known that I, FRANK L. SESSIONS, a citizen of the United States, and a resident of Lakewood, county of Cuyahoga, and State of Ohio, have invented a new and useful Improvement in Vehicle Wheel-Rims, of which the following is a specification, the principle of the invention being herein explained and the best mode in which I have contemplated applying the principle, so as to distinguish it from other inventions.

The subject of the present invention is an improved locking means for a detachable flange adapted for use on any of the standard types of wheel rims. The use of a single pivotal locking member which engages the ends of a split retaining flange is, of course, well-known, but in the type of construction which is in general use the member is mounted about an axis at right angles to the plane of the adjacent part of the rim and is cumbersome and awkward to operate.

The present invention provides a locking member which is pivotally mounted about an axis adjacent to the rim of the wheel and parallel to the plane of the same, and is designed to be as neat and compact as possible.

To the accomplishment of these and related ends, said invention then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing: Figure 1 is a side elevation showing a portion of a wheel rim upon which is used the present invention; Fig. 2 is a side elevation of the ends of the retaining flange and a section through the apertures in the rim, Figs. 1 and 2 being on a larger scale than the remaining figures; Fig. 3 is a cross section on the line 3—3 in Fig. 1; Fig. 4 is a similar section showing the locking member when disengaged; Fig. 5 is a plan view of a rim section showing the disposition of the apertures on the flange; and Fig. 6 is a perspective view of the locking member.

In Figs. 3 and 4 there is shown a tire-supporting rim 1 mounted on a felly 2. Any type of side flanges may be used for retaining the tire upon this rim, but I have shown a reversible side-flange, adapted for either straight-side or clencher tires. In order to permit the tire to be readily placed on and removed from the rim 1, one of the said side flanges, namely the flange at the right in Figs. 3 and 4, is made removable or detachable. With this in view, said flange 4 is transversely split and provided near each end with a downward projecting lug 5, the flange, when in place on the rim, being designed to seat in an encircling depression or groove, the outer wall of which lies substantially flush with the outer surface of the rim. Each of the lugs 5 on said detachable flange 4 is provided with a laterally extending shoulder 6, the two shoulders facing each other and the lugs being adapted to enter two alined, adjacently disposed apertures 7 in the bottom of the groove in the rim, through which latter they project a sufficient distance to bring such shoulders inside of said rim, as shown in Fig. 1. Between the two apertures 7, and projecting radially inwardly from the rim, there is mounted a projection or lug 8, in the lower part of which is in turn mounted a pin 9 disposed substantially parallel to a tangent to the rim at a point adjacent to said lug. About this pin as an axis there is pivotally mounted a retaining or locking member 10, provided at its outer end with two laterally extending shoulders.

Upon the outer face of the lug 8 there is a circular surface 12 which is adapted to be engaged by a resilient strip or extension 13 on the locking member. In the position shown in Fig. 4, when the locking member is in engagement with the shoulders on the lugs, the resilient strip or flat spring 13 engages this surface on the lug 8 and retains the locking member in such engagement. In order to disengage the locking member, it is necessary to turn the same about its axis away from the rim, and when so moved the spring will act upon the surface to retain the locking member out of engagement.

In order to insert the two lugs on the flange in the apertures in the rim, it is necessary to place one of the lugs in the proper aperture and to draw the flange snugly around the rim until the other lug will enter the second of the two apertures. When the lugs have both been inserted in the apertures, the locking member is turned, or oscillated about its axis into the position shown in Fig. 3, when the two shoulders 11 will engage the upper surfaces of the shoulders 6 on the lugs 5, thus preventing the latter from disengaging from the apertures and firmly securing the flange in place.

The lugs 5 are so disposed on the flange and the apertures are so spaced on the rim that engagement may be had whether the flange is serving to hold a straight side or clencher tire, as will be readily seen from Fig. 5. The encircling groove against the outer wall 14 of which the flange 4 rests, is of the usual construction as is the opposite wall 15. The inner removable flange 16, which coöperates with the wall 15, and the other necessary parts of the device may be of any suitable construction, as in fact may the first-named removable flange, since it is not essential that it be of the reversible type. The invention consists in the compact and convenient locking means for securely retaining the outer removable flange in position, particular attention being directed to the pivoting of the locking member about an axis substantially parallel to a tangent to the rim at a point adjacent to such member.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a wheel, the combination with a tire-supporting rim and a split side-flange removably mounted on said rim; of means for locking said flange in place, said means including a lug on said flange adapted to project inside of said rim; and a locking member attached to said rim so as to be oscillatory about an axis substantially parallel to a tangent to said rim at an adjacent point thereon, said member being adapted in one position to engage the lug on said flange.

2. In a wheel, the combination with a tire-supporting rim and a split side-flange removably mounted on said rim; of means for locking said flange in place, said means including a lug on said flange adapted to project inside of said rim, said lug being provided with a shoulder; and a locking member pivotally attached to said rim about an axis substantially parallel to a tangent to said rim at an adjacent point thereon, said member being adapted to engage the shoulder on said lug.

3. In a wheel, the combination with a tire-supporting rim and a split side-flange removably mounted on said rim; of means for locking said flange in place, said means including a lug on said flange adapted to project inside of said rim; a locking member attached to said rim so as to be oscillatory about an axis substantially parallel to a tangent to said rim at an adjacent point thereon, said member being adapted in one position to engage the lug on said flange; and means adapted to retain said member in such engaging position.

4. In a wheel, the combination with a tire-supporting rim and a split side-flange removably mounted on said rim; of means for locking said flange in place, said means including a lug on said flange adapted to project inside of said rim; a locking member attached to said rim so as to be oscillatory about an axis substantially parallel to a tangent to said rim at an adjacent point thereon, said member being adapted in one position to engage the lug on said flange; and resilient means adapted to retain said member in such engaging position.

5. In a wheel, the combination with a tire-supporting rim and a split side-flange removably mounted on said rim; of means for locking said flange in place, said means including a lug on said flange adapted to project inside of said rim; a locking member attached to said rim so as to be oscillatory about an axis substantially parallel to a tangent to said rim at an adjacent point thereon, said member being adapted in one position to engage the lug; and means adapted optionally to retain said member either in or out of such engaging position.

6. In a wheel, the combination with a tire-supporting rim and a split side-flange removably mounted on said rim, of means for locking said flange in place, said means including a lug on said flange adapted to project inside of said rim; a locking member attached to said rim so as to be oscillatory about an axis substantially parallel to a tangent to said rim at an adjacent point thereon, said member being adapted in one position to engage the lug on said flange; and a spring adapted optionally to retain said member either in or out of such engaging position.

7. In a wheel, the combination of a tire-supporting rim; a split side-flange removably mounted on said rim; lugs on said flange near its respective ends adapted to project inside of said rim; and a locking member attached to said rim so as to be oscillatory about an axis substantially parallel to a tangent to said rim at an adjacent point thereon, said member being adapted in one position to engage the lugs on said flange and thereby secure the latter in place.

8. In a wheel, the combination of a tire-supporting rim; a split side-flange removably mounted on said rim; lugs on said flange, one near each end, adapted to project inside said rim, said lugs being provided with shoulders on their adjacent sides; a locking member pivotally attached to said rim about an axis substantially parallel to a tangent to said rim at an adjacent point thereon; and shoulders on said locking member adapted to engage the shoulders on said lugs and thereby secure said flange in place.

9. In a wheel, the combination of a tire-supporting rim having two alined openings adjacent to each other; a split side-flange removably mounted on said rim; two lugs on said flange, one near each end, respectively adapted to project through such openings, said lugs being provided with shoulders on their adjacent faces; a locking member attached to said rim between said openings so as to be oscillatory about an axis substantially parallel to a tangent to said rim at an adjacent point thereon; and shoulders on said locking member adapted to engage the shoulders on said lugs and thereby secure said flange in place.

10. In a wheel, the combination of a tire-supporting rim having two alined openings adjacent to each other; a split side-flange removably mounted on said rim; two lugs on said flange, one near each end, respectively adapted to project through such openings, said lugs being provided with shoulders on their adjacent faces; a locking member attached to said rim between said openings so as to be oscillatory about an axis substantially parallel to a tangent to said rim at an adjacent point thereon; shoulders on said locking member adapted to engage the shoulders on said lugs and thereby secure said flange in place; and means adapted to retain said member in such engaging position.

11. In a wheel, the combination of a tire-supporting rim having two alined openings adjacent to each other; a split side-flange removably mounted on said rim; two lugs on said flange, one near each end, respectively adapted to project through such openings, said lugs being provided with shoulders on their adjacent faces; a locking member attached to said rim between said openings so as to be oscillatory about an axis substantially parallel to a tangent to said rim at an adjacent point thereon; shoulders on said locking member adapted to engage the shoulders on said lugs and thereby secure said flange in place; and means adapted optionally to retain said member either in or out of such engaging position.

12. In a wheel, the combination of a tire-supporting rim having an encircling groove with two alined openings adjacent each other in the bottom of such groove; a split side-flange adapted to removably seat in such groove; two lugs on said flange, one near each end, respectively adapted to project through one of the openings in such groove, said lugs being provided with shoulders on their adjacent faces; a locking member pivotally attached to said rim between such openings so as to be oscillatory about an axis substantially parallel to a tangent to said rim at an adjacent point thereon; and shoulders on said locking member adapted in one position of the latter to engage the shoulders on said lugs and thereby secure said flange in place.

13. In a wheel, the combination of a tire-supporting rim having an encircling groove with two alined openings adjacent each other in the bottom of such groove; a split side-flange adapted to removably seat in such groove; two lugs on said flange, one near each end, respectively adapted to project through one of the openings in such groove, said lugs being provided with shoulders on their adjacent faces; an inwardly extending projection on said rim between such openings; a locking member attached to said projection so as to be oscillatory about an axis substantially parallel to a tangent to said rim at an adjacent point thereon; and shoulders on said locking member adapted in one position of the latter to engage the shoulders on said lugs and thereby secure said flange in place.

14. In a wheel, the combination of a tire-supporting rim having an encircling groove with two alined openings adjacent each other in the bottom of such groove; a split side-flange adapted to removably seat in such groove; two lugs on said flange, one near each end, respectively adapted to project through one of the openings in such groove, said lugs being provided with shoulders on their adjacent faces; an inwardly extending projection on said rim between such openings; a locking member pivoted to said projection about an axis parallel to a tangent to said rim at an adjacent point thereof; and shoulders on said locking member adapted in one position of the latter to engage the shoulders on said lugs and thereby secure said flange in place.

15. In a wheel, the combination of a tire-supporting rim having an encircling groove with two alined openings adjacent each other in the bottom of such groove; a split side-flange adapted to removably seat in such groove; two lugs on said flange, one near each end, respectively adapted to project through one of the openings in such groove, said lugs being provided with shoulders on their adjacent faces; an inwardly extending projection on said rim between such openings; a locking member pivoted to said projection about an axis parallel to a tangent to said rim at an adjacent point thereon; shoulders on said locking member adapted in one position of the latter to engage the shoulders on said lugs and thereby secure said flange in place; and a spring carried by said member and adapted to coöperate with said projection to retain said member in such engaging position.

Signed by me, this 2nd day of May, 1912.

FRANK L. SESSIONS.

Attested by—
H. B. Fay,
Jno. F. Oberlin.